(12) United States Patent
Watts, III

(10) Patent No.: US 6,810,370 B1
(45) Date of Patent: Oct. 26, 2004

(54) METHOD FOR SIMULATION CHARACTERISTIC OF A PHYSICAL SYSTEM

(75) Inventor: James W. Watts, III, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/524,297

(22) Filed: Mar. 14, 2000

Related U.S. Application Data

(60) Provisional application No. 60/127,202, filed on Mar. 31, 1999.

(51) Int. Cl.[7] .......................... G06F 17/10; G06F 17/11
(52) U.S. Cl. ............................... 703/10; 703/2; 703/9; 703/6; 703/11; 716/20
(58) Field of Search ................................ 703/10, 11, 9, 703/2, 6; 716/20

(56) References Cited

U.S. PATENT DOCUMENTS

| | | | |
|---|---|---|---|
| 3,702,009 A | 10/1972 | Baldwin, Jr. .................... 444/1 |
| 4,821,164 A | 4/1989 | Swanson ..................... 364/420 |
| 5,265,040 A | 11/1993 | Saji et al. .................... 364/578 |
| 5,321,612 A | 6/1994 | Stewart ....................... 364/420 |
| 5,408,638 A | 4/1995 | Sagawa et al. ............. 395/500 |
| 5,442,569 A | * 8/1995 | Osano .......................... 716/20 |
| 5,548,798 A | 8/1996 | King ........................... 395/888 |
| 5,604,911 A | * 2/1997 | Ushiro .......................... 703/2 |
| 5,684,723 A | 11/1997 | Nakadai ..................... 364/578 |
| 5,710,726 A | 1/1998 | Rowney et al. ............. 364/578 |
| 5,740,342 A | * 4/1998 | Kocberber .................. 345/420 |
| 5,819,068 A | 10/1998 | Hasse ......................... 395/500 |
| 5,864,786 A | 1/1999 | Jericevic ..................... 702/189 |
| 5,936,869 A | * 8/1999 | Sakaguchi et al. ............. 703/1 |
| 5,953,239 A | 9/1999 | Teixeira et al. ............. 364/578 |
| 6,038,389 A | * 3/2000 | Rahon et al. ................. 703/10 |
| 6,052,520 A | * 4/2000 | Watts, III .................... 703/10 |
| 6,219,440 B1 | * 4/2001 | Schaff et al. ............... 382/128 |
| 6,252,601 B1 | * 6/2001 | Tanaka ....................... 345/423 |
| 6,453,275 B1 | * 9/2002 | Schoenmaker et al. ........ 703/2 |

OTHER PUBLICATIONS

"Numerical Solution of Nonlinear Two–Point Boundary Problems by Finite Difference Methods" J. Holt, Communications of the ACM, vol. 7, No. 6, Jun. 1964.*

"A Vectorized 3–D Finite Element Model for Transient Simulation of Two–Phase Transformation and a Moving Interface", M. Christon, Colorado State University, IEEE CH2916–5/90/0000/0436, 1990.*

(List continued on next page.)

*Primary Examiner*—Hugh Jones
*Assistant Examiner*—Fred Ferris

(57) ABSTRACT

A method is provided for simulating at least one characteristic of a physical system. The physical system is discretized into a plurality of volumetric cells having boundaries therebetween. An initial estimate of state variables is assigned for each cell. For each cell, linear equations are constructed relating its state variables to the state variables of cells adjacent to it. A transportability value is associated with each boundary and the boundaries are ranked corresponding to descending transportability values. The boundary rankings are used to construct topologically one-dimensional strings of cells. A matrix equation for each string is constructed by assembling the linear equations associated with the cells of each string. Improved estimates of the state variables of the cells are determined by solving the matrix equations. These state variables are then used to simulate at least one characteristic of the physical system.

35 Claims, 4 Drawing Sheets

OTHER PUBLICATIONS

Richard Burrows, et al., "Parallel Reservoir Simulation with Nested Factorisation", $5^{th}$ European Conference on the Mathematics of Oil Recovery, Leoben, Austria, Sep. 3–6, 1996, pp. 19–37.

Youcef Saad, "Krylov Subspace Methods on Supercomputers", Siam J. Sci Stat. Comput., vol. 10, No 6, pp. 1200–1232, Nov. 1989.

Dalsoo Shin, "A New Iterative Solution Method With Alternating Interblock Direction (AID) Preconditioner", 13th SPE Symposium on Reservoir Simulation, San Antonio, Feb. 12–15, 1995, vol. SPE 29101, pp. 71–76.

Fernando Rodriguez et al, "A General Formulation for Compositional Reservoir Simulation", SPE International Petroleum Conference & Exhibition of Mexico, Oct. 10–13, 1994, vol. SPE 28705, pp. 377–391.

Khalid Aziz, "Reservoir Simulation Grids: Opportunities and Problems", JPT, Jul., 1993, pp. 658–663, vol. SPE 25233.

L. T. Fussell et al., "An Interative Technique for Compositional Reservoir Models", Society of Petroleum Engineers Journal, Aug. 1979, pp. 211–220.

J. W. Watts, "A Method for Improving Line Successive Overrelaxation in Anisotropic Problems–A Theoretical Analysis", Society of Petroleum Engineers Journal, Apr. 1973, pp. 105–118.

* cited by examiner

METHOD FOR SIMULATION CHARACTERISTIC OF A PHYSICAL SYSTEM This application claims the benefit of U.S. Provisional Application No. 60/127,202 file Mar. 31, 1999.

FIELD OF THE INVENTION

This invention is directed, in general, to simulating at least one characteristic of a physical system. In one aspect, the invention relates to a method for simulating a physical system such as a hydrocarbon-bearing reservoir to predict fluid properties and behavior in the reservoir.

BACKGROUND OF THE INVENTION

Numerical simulation is widely used in industrial fields as a method of simulating a physical system by using a computer. In most cases, there is desire to model the transport processes occurring in the physical systems. What is being transported is typically mass, energy, momentum, or some combination thereof. By using numerical simulation, it is possible to reproduce and observe a physical phenomenon and to determine design parameters, without actual experiments using a model and apparatus. It can be expected therefore that design time and cost can be reduced considerably.

One type of simulation of great interest is a process of inferring the behavior of a real hydrocarbon-bearing reservoir from the performance of a model of that reservoir. The objective of reservoir simulation is to understand the complex chemical, physical, and fluid flow processes occurring in the reservoir sufficiently well to predict future behavior of the reservoir to maximize hydrocarbon recovery. Reservoir simulation often refers to the hydrodynamics of flow within a reservoir, but in a larger sense reservoir simulation can also refer to the total petroleum system which includes the reservoir, injection wells, production wells, surface flowlines, and surface processing facilities.

The principle of numerical simulation is to numerically solve equations describing a physical phenomenon by a computer. Such equations are generally ordinary differential equations and partial differential equations. As a means for numerically solving such equations, there are known the finite element method, the finite difference method, the finite volume method, and the like. In each of these methods, the physical system to be modeled is divided into smaller cells (a set of which is called a grid or mesh), and the state variables continuously changing in each cell are represented by sets of values for each cell. An original differential equation is replaced by a set of equations to express the fundamental principles of conservation of mass, energy, and/or momentum within each smaller unit or cells and of movement of mass, energy, and/or momentum between cells. These equations can number in the millions. Such replacement of continuously changing values by a finite number of values for each cell is called "discretization". In order to analyze a phenomenon changing in time, it is necessary to calculate physical quantities at discrete intervals of time called timesteps, irrespective of the continuously changing conditions as a function of time. Time-dependent modeling of the transport processes proceeds in a sequence of timesteps.

For most transport processes, the governing equations are nonlinear because the amount of mass, energy, or momentum in a cell and the movement of mass, energy, and momentum between cells typically have nonlinear relationships with the variables that define the physical state of the cells. In simulating a hydrocarbon reservoir, for example, the equations that model the reservoir are nonlinear partial differential equations that describe the unsteady-state flow of all fluids throughout the reservoir and relate the pressure and saturation changes of the fluids with time throughout the reservoir.

To simulate many physical systems, it is desirable to use implicit computations in which movement of a transported entity between cells depends on the solution at the end of a timestep. Implicit calculations require that the unknowns at the end of a timestep all be determined together. As a result, if the equations are nonlinear, the unknowns are typically computed using iteration. Iteration involves starting with some initial guess for the unknowns and applying some repetitive calculation to improve the guess until, after a sufficient number of iterations, the equations are satisfied to within some acceptable tolerance level. Since each iteration requires computing time, there is an incentive to use an iterative method that reduces the computing time as much as possible. Numerous iterative methods have been proposed for solving sets of nonlinear equations. One example is the well-known Newton-Raphson method.

The approximation used in a Newton-Raphson iteration results in a linear set of equations relating the unknowns at each cell to unknowns at its neighbors. These sets of equations are assembled into a global matrix equation that is then solved to obtain the next estimate of the solution. A similar matrix equation is obtained if the representation of the physical system is linear. In either case, the matrix equation is generally quite large and best solved iteratively. One iterative method for solving such matrix equations is a procedure called point Gauss-Seidel. In point Gauss-Seidel, a new solution estimate is calculated cell by cell. At each cell the new estimate is obtained by solving the mass, energy, and momentum balance equations for that cell, while holding unknown corresponding values at neighboring cells fixed at their latest estimates. In this procedure, a neighboring cell is one with which the current cell is in communication. A cell's mass, energy, or momentum balance equations will contain terms multiplying the unknowns at its neighbors. When this calculation is repeated for all equations in the system, a new array of answers is created. This array is then checked to determine if the values satisfy the cell equations. To do this, it is convenient to define a residual (r) for each equation. If the new values satisfy the equations, then all residuals will be zero or very small. If not, the process is repeated with updated values of the unknown that are based on the previous iteration. This process is repeated until all the residuals are acceptably close to zero. This type of iterative method is called a "point" iterative method because the method is performed a point, or cell, at a time.

Faster convergence can be obtained if point Gauss-Seidel is replaced by point-successive overrelaxation, or PSOR. In PSOR, the change in the estimated solution at each iteration is multiplied by an overrelaxation parameter, co, which must have a value between one and two.

Successful application of PSOR in simulation is generally limited to relatively simple models. Because PSOR methods are "explicit" methods in which only one cell's unknown values are calculated at a time, PSOR methods are prone to slow convergence. This shortcoming has led to efforts to include more implicitness in the solution methods. One method for doing this is called line-successive overrelaxation (LSOR). LSOR improves on PSOR by preserving implicitness in one direction. In it, the mass, energy, or momentum balance equations for a column or row of cells are solved simultaneously while the contributions of adjacent columns or rows are kept at their most recent estimates. Examples of LSOR applications can be found in (1) Mattax, C. C. and Dalton, R. L., *Reservoir Simulation, Monograph* Volume 13, Society of Petroleum Engineers (1990) and (2) Aziz, K. and Settari, A., *Petroleum Reservoir Simulation*, Applied Science Publishers Ltd, London, 1979.

The LSOR method used in the past has been applied primarily to models in which the cells are organized in a regular, structured grid having well defined rows or columns. Many models have been proposed with at least some of the cells arranged in a grid lacking this regular structure. It is believed that the practice of this invention represents the first application of LSOR principles to unstructured grids. Commercial use of unstructured grids has been slowed by the high cost of solution techniques for unstructured grids as compared to structured grids. A need exists for a simulation method that can be used to analyze representations of physical system using all types of cell configurations.

SUMMARY

The method of this invention is used to simulate at least one characteristic of a physical system, regardless of whether the physical system has been discretized into cells occurring in structured or unstructured grids or a combination of both. The first step of the method is to discretized the physical system into a plurality of volumetric cells arranged adjacent to one another so as to have a boundary between each pair of neighboring cells. For each cell, linear equations are constructed that relate a cell's state variables to the state variables of its neighboring cells. The next steps are to associate with each boundary a transportability value and then to rank the boundaries corresponding to a descending order of transportability values. The boundary rankings are then used to construct topologically one-dimensional strings of cells. A matrix equation is developed for each string by assembling the linear equations associated with the cells of each string. Improved estimates of the state variables of the cells are then obtained by solving the matrix equation for each string, one string at a time, until the matrix equations for all strings have been solved. This process is repeated iteratively until a convergence condition is satisfied. This solution produces state variables for all cells that simultaneously satisfy the linear equations for all cells. The state variables produced by the iteration can be used to simulate at least one characteristic of the physical system.

In a preferred embodiment, the construction of strings uses a rule that promotes the formation of strings having high transportability values at cell boundaries in the string cells.

BRIEF DESCRIPTION OF THE DRAWINGS

The present invention and its advantages will be better understood by referring to the following detailed description and the attached drawings, in which the like elements have been given like numerals and wherein.

Figures 1, 2, 3:
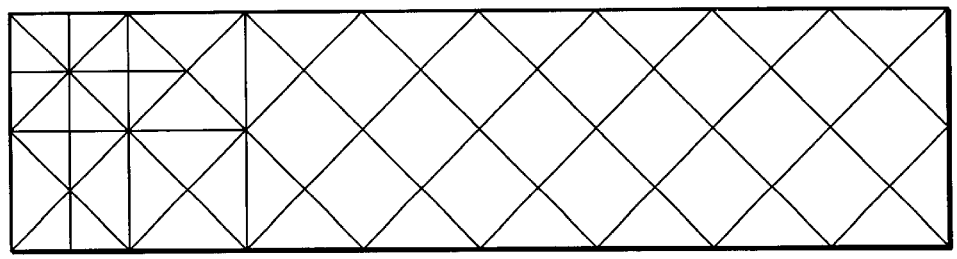
FIG. 1 is a simplified example of a two-dimensional Cartesian grid system having five rows and ten columns where the geometry of the cells indicates strength of coupling between cells, with the coupling between cells being strongest for flow in the vertical direction (within columns).
FIG. 2 is a simplified example of a two-dimensional Cartesian grid system similar to the example of FIG. 1 except that the coupling between cells for flow in the horizontal direction decreases in moving from left to right and for flow in the vertical direction increases in moving from left to right.
FIG. 3 is a simplified example of a two-dimensional unstructured grid system in which the cells do not have the same shape and the coupling between cells does not follow a fixed pattern.

The drawings are not intended to exclude from the scope of the invention other embodiments that are the result of normal and expected modifications of these specific embodiments.

DETAILED DESCRIPTION OF THE INVENTION

The present invention provides a new method for simulating a physical system which is numerically represented by partial differential equations. The method can be used in simulating two- and three-dimensional domains that are discretized into structured grids, unstructured grids, or a combination of both. It can also be used in situations in which the computational approach yields a topology having more than three dimensions, such as occurs in simulating fractured porous media. The invention is particularly useful in simulating a characteristic of a physical system in which a transport phenomenon is occurring. The term "transport phenomena" as used in this patent is used in a broad sense to include momentum transport (viscous flow), energy transport (heat conduction, convection, and radiation), and mass transport (diffusion). The present invention can be applied to widely different areas such as physics, rock characterization, crystallography, electrical engineering, biology, mathematics, fluid mechanics, and petroleum engineering.

A common practice in simulation operations is to represent a linear set of equations resulting from the discretization of governing partial differential equations over the physical domain to be simulated by the equation $Mx=y$ (where M is a coefficient matrix of size $n \times n$, that is n rows by n columns, x is a column vector of size n representing unknown values, y is a column vector of size n representing a set of known values). A basic operation in the simulation operations is solving this system of linear equations. This operation arises, for example, in the Newton-Raphson method for nonlinear equation solution, as well as during the implicit integration of ordinary differential equations. Traditional methods for solving the partial differential equation depend on block partitioning of the coefficient matrix M. These solution methods include iterative techniques such as line-based relaxation, convergence acceleration schemes such as additive correction, and pre-conditioners such as nested factorization. Prior to this invention, a significant problem arose in constructing a block structure from unstructured grids. The method of this invention overcomes this difficulty by ordering and collecting nodes in an unstructured grid to produce a block matrix structure within coefficient matrix M that allows block-based numerical solution algorithms to be used and at the same time promotes good convergence.

The inventor has discovered that the governing matrix equations for a physical system can be solved by using topological strings of cells that are constructed based on rankings of transportability values that are determined for boundaries between each pair of neighboring cells. When the coefficient matrix M is formed, each string is associated with a block in M.

The term transportability as used in this patent refers to a measure of the ease or capability of some entity such as matter, energy, or electrical charge to move across a cell boundary (or cell connection) during a given time interval. The entity being transported could for example be mass or volume of fluid, number of particles, thermal energy, radiation, or electricity. If the physical system being simulated is a hydrocarbon reservoir, transportability as used in this description of the invention is synonymous with transmissibility, a term that is familiar to those skilled in the art as a measure of the ability of a fluid to flow between two neighboring cells representing a volume within a porous medium. Transmissibility is expressed as $$\frac{kA}{\Delta x},$$

where k is the effective permeability of the porous medium, A is the area of the boundary between the neighboring cells, and $\Delta x$ is the average or characteristic distance that the fluid must travel in moving between the two cells.

In practicing the method of the present invention, the first step is to discretized the physical system into a plurality of volumetric cells arranged adjacent to one another so as to have a boundary between each pair of neighboring cells. The discretization is performed using finite difference, finite volume, finite element, or similar methods that are based on dividing the physical system to be modeled into smaller units. The description of the present invention that follows primarily refers to finite difference methods. Those skilled in the art will recognize that the invention can also be applied in connection with finite element methods or finite volume methods. When it is applied with finite element methods, the cells become finite elements, and when it is applied with finite volume methods, the cells become finite volumes. Regardless of which of these methods is used, they all reduce partial differential equations to a finite-dimensional system of algebraic equations.

In reservoir simulations, finite difference equations representative of rock and fluid properties for each fluid are constructed for each gridcell. These equations in effect equate the physical system to be analyzed to a volumetric system comprising a plurality of smaller contiguous cells. When using the finite difference and finite volume methods, the smaller units are typically called cells or gridblocks, and when using the finite element method the cells are typically called elements. These cells or elements can number from fewer than a hundred to millions. In this patent, for simplicity of presentation, the term cell is used, but it should be understood that if a simulation uses the finite element method the term element would replace the term cell as used in this description.

In the practice of this invention, the cells can be of any geometric shape, such as parallelepipeds (or cubes) or hexahedrons (having four vertical corner edges which may vary in length), or tetrahedra, rhomboids, trapezoids, or triangles. The grid can comprise rectangular cells organized in a regular, structured pattern, or it can comprise cells having a variety of shapes laid out in an irregular, unstructured pattern, or it can comprise a plurality of both structured and unstructured patterns. Completely unstructured grids can be assembled that assume almost any shape. All the cells are preferably boundary aligned, thereby avoiding having any side of a cell contacting the sides of two other cells.

In this patent, the term boundary is sometimes used interchangeably with the term connection. Two cells have a connection if there can be movement of matter, energy, or electrical charge from one cell to the other. In a structured grid, each cell has a fixed number of neighbors to which it is connected. In an unstructured grid, the number of connections can vary from cell to cell.

The next step in the method is to select state variables for each cell. The state variables are those variables that are necessary and sufficient to specify the state of the system. Given the state variables, it must be possible to compute all other properties of the cell. For reservoir simulation, one of the state variables nearly always is pressure. The others can comprise physical properties such as saturations, species concentrations, and species amounts. For simplicity, the discussion that follows refers to these state variables other than pressure simply as saturations, with the understanding that they can comprise a variety of physical properties that may not include saturation. These properties can be obtained in whole or part from actual reservoir data, or they can be determined experimentally or estimated, depending on the type of reservoir simulation being performed and the availability of actual reservoir data. Determination of suitable state variables and estimating their initial values can be readily determined by those skilled in the art.

The description of the invention assumes that a time-dependent problem is being solved. However, sometimes it is desirable to solve steady-state problems. The principles disclosed in this description can also be applied to steady-state problems. Like time-dependent problems, steady-state problems involve solving a matrix equation one or more times.

For each cell, linear equations are constructed that relate a cell's state variables to the state variables of its neighboring cells. These equations are constructed to express the fundamental principles of the conservation of mass, energy, or momentum within each cell and the movement of mass, energy, or momentum between cells. In reservoir simulation, the nonlinear terms that appear in the nonlinear finite difference equations are linearized and based on this linearization, a linear set of algebraic equations is constructed. These equations can vary significantly depending on the method chosen for the simulations operation. The methods that have been proposed for simulating a reservoir differ primarily on how they treat the way the reservoir state variables (such as pressure and saturation) vary in time. In many of these methods, values of the state variables are not known until calculations for the timestep have been completed. As a result, they must be determined using an iterative process.

A commonly used procedure for simulating reservoirs is called the implicit-pressure explicit-saturation method (IMPES method). In the IMPES method, flows between neighboring cells are computed based on pressures at their values at the end of the timestep and saturations at their values at the beginning of the timestep. In this method, the pressures at the end of the timestep are interdependent and must be determined simultaneously. This method is called "implicit" because each pressure depends on other quantities (for example, other pressures at the end of the timestep) that are known only implicitly. The basic procedure is to obtain a single pressure equation by a combination of the conservation equations. After the pressure has been advanced in time, the saturations are updated explicitly. After the saturations are calculated, new relative permeabilities and capillary pressures can be calculated; these are explicitly used at the next timestep.

Another procedure used in reservoir simulation is called the Fully Implicit method, which treats both pressure and saturations implicitly. Flow rates are computed using phase pressures and saturations at the end of each timestep. The calculation of flow rates and pressure and saturation solutions involves the solution of nonlinear equations using a suitable iterative technique. As the pressures and saturations are solved, the updating of these terms continues using new values of pressure and saturation. The iteration process terminates when the convergence criteria are satisfied.

Still another procedure used in reservoir simulation is called the Sequential Implicit method (SEQ method). This method incorporates implicit treatment of saturations, but without solving simultaneously for pressures and saturations. It consists of two steps. The first step solves a set of pressure equations in exactly the same way as is done in the IMPES method. This set comprises a single equation per cell, and solving it yields a complete, new pressure distribution at the end of a timestep. In a second step, the pressure distribution is used to calculate the sum of the velocities of all phases at each boundary between cells. These total velocities are used in constructing a set of saturation equations. This set comprises two equations per cell in three phase cases and one equation per cell in two phase cases and is solved simultaneously to yield saturations at the new time. The second step is an implicit solution for saturations using linearized implicit velocities. Saturations in each cell are determined by using implicit (end-of-time-step) linearized values of relative permeabilities and capillary pressures in inter-cell fluid flow terms. This method requires simultaneous solution of all saturation equations.

The linearization of non-linear equations and the steps used in solving the equations are dependent on each other. In the process of linearization, the algebraic equations will have different forms depending on the solution technique chosen. For example, the IMPES method linearizes only the pressure-dependent terms, such as specific volume. The specific volume is therefore expressed as a linear function of pressure. The SEQ method linearizes the same pressure-dependent terms with respect to pressure, and it also linearizes phase fractional flow terms with respect to saturations. The Fully Implicit method linearizes the pressure-dependent terms with respect to pressure and the saturation-dependent terms (which comprise the relative permeabilities and capillary pressures) with respect to saturations.

It is possible to use any of these methods in a non-iterative fashion, in which solving the linearized equations gives a solution at the end of each timestep. However, with the Fully Implicit method, this is rarely done. Instead the Fully Implicit solution for a timestep is normally obtained using a Newton-Raphson iteration, in which solving the linearized equations yields an approximate solution. Newton-Raphson iterations are repeated until the resulting estimates of the solutions are considered to be accurate enough based on pre-specified convergence criteria.

Selection of suitable simulation method and construction of suitable linear equations for simulating a physical system can be performed by those skilled in the art. This invention is not limited to IMPES, Fully Implicit, or SEQ simulation methods. Other known simulation methods, and simulation methods yet to be discovered, can be used in the practice of this invention. Examples of methods for constructing mathematical models of reservoirs are described in Peaceman, D. W., *Fundamentals of Numerical Reservoir Simulation*, Elsevier Scientific Publishing Company, Amsterdam, (1977); and Mattax, C. C. and Dalton, R. L., *Reservoir Simulation*, Monograph Volume 13, Society of Petroleum Engineers (1990).

The next step of the present invention is to associate a transportability value with each boundary (or connection) between adjacent pairs of cells. The transportability values correspond to the coupling strength of each connection between cells, which will be a measure of how strongly the connection couples the two connected cells to each other. If two cells are strongly coupled, they have a strong communication with each other; a change in state variables at one cell will have a substantial effect on the state variables in the other cell. If two cells are weakly coupled (weakly connected), a change at one will have little effect on the other. For simulation of a fluid-bearing porous medium using finite differences, the coupling strength can be considered to be the connection's transmissibility. For simulation operations of other physical systems, the coupling strength may correspond to other known or easily-determined physical quantities. For some modeling, coupling strength can be determined directly from the coefficients of the matrix equations. One skilled in the art would be able to determine a suitable measure of coupling strength between cells for the physical system being analyzed.

Once the transportability values are determined, the cell connection (coupling strengths) are ranked from the one having the greatest strength to the one having the least strength. In doing this, ties in coupling strength can be broken in any suitable fashion. Preferably, the ranking of connection strengths is performed using a suitable ordering process. A preferred ordering process uses the QUIKSORT algorithm that is described in a book by William H. Press, Saul A. Teukolsky, William T. Vetterling, and Brian P. Flannery, *Numerical Recipes*, Second Edition, Cambridge University Press (1994).

Based on the rankings of the transportability values between cells, topologically one-dimensional strings of cells are then constructed. The strings are constructed to contain as many of the strongest connections (highest transportability values) as possible. Beginning at the highest ranked transportability value (that is, the strongest connection), an in-string connection is created between the two cells that it connects. The next highest ranked transportability value is then selected, and a second in-string connection is placed between the two cells that it connects. This process is repeated recursively until all the cell connections have been considered for possible inclusion in a string of cells. In this method, each cell is permitted to have no more than two in-string connections. If one of a connection's cells already has two in-string connections, the connection cannot be added to a string.

Each cell can be connected to at most two other cells in the same string. Therefore, no more than two of a cell's neighbors can be in the same string. One of the neighbors will lie above, or behind, it in the string, and one will lie below, or ahead, of it. Nearly all cells will have in-string connections to two neighbors. Cells lying at a string's end will have an in-string connection to only one neighbor. A few cells may not have in-string connections to any neighbors. These cells will form single-cell strings. A string comprising a plurality of cells forms a topologically one-dimensional line, but the line is not necessarily straight physically.

After strings have been created, some of the strings could, and will likely, touch themselves. A string touches itself if it contains a cell that is connected to more than two other cells in the string. In addition, a string may be created that is circular. In the preferred rule for string construction, neither circular strings nor strings that touch themselves are permitted. If one of these conditions occurs in a string, the string is cut.

Although a variety of cutting procedures could be applied, the following describes a preferred procedure. If the string is circular, the string can be cut anywhere, but preferably the cut is made at the string's lowest ranking in-string connection. For cutting a non-circular string that touches itself, begin at the top of the string, proceed down the string, and determine at each cell whether a cell touches (is connected to) another cell in the same string that is ahead of but not immediately ahead of it within the string. If a cell does touch another cell in the same string that is ahead of but not immediately ahead of it within the string, the string will be cut somewhere between the current cell and the cell that it touches. This identification process continues down the cells of the string and until the last cell is identified that touches another cell in the same string that is ahead of but not immediately ahead of it within the string and the first cell is identified that touches another cell in the same string that is behind but not immediately behind it within the string. The string is preferably cut at the lowest ranking connection between these two cells. This analysis of the string, and the cutting process, as needed, are continued until no part of a string touches itself.

The desired final outcome is a set of strings satisfying the rules that (1) each string does not have connections to itself other than those within the string and (2) no string is circular. If a string does not satisfy these rules, the string is severed so that it does satisfy the rules.

In representing the cells in a computer, each cell is assigned an index number that identifies it. Each string will be defined by an ordered list of these indices, the first index indicating the cell at which the string begins, the next index indicating the next cell in the string, and so on, until the last index, which indicates the cell at which the string ends. In effect, the cell's position in the string is indicated by its index's position in this list of indices.

A more detailed description of the preferred string cutting process is as follows. The first step is to cut any circular strings. First, the circular strings must be found. This is done by a process of elimination using the following procedure. As noted above, the cells are indexed. Beginning with the cell having the smallest index, 1. Examine each cell to determine whether it has been marked as belonging to a non-circular string. If it has, proceed to the cell with the next larger index.
2. If the cell has not been marked as belonging to a non-circular string, determine whether it has string connections to two other cells. If it does, proceed to the cell with the next larger index.
3. If the cell has no string connections, it belongs to a single-cell string. It is marked as belonging to a non-circular string, its string is added to the list of strings, and the cell's index is added to the new string's list of cells.
4. If the cell has one string connection, it forms the beginning of the next string. Mark the cell as belonging to a non-circular string, add the string to the list of strings, initialize the string's list of cells, and then add the cell's index to this list of cells. Trace the string from one cell to the next by following its string connections, marking each cell as belonging to a non-circular string and adding each cell's index to the string's list of cells. When a cell is reached that does not have a string connection to another cell, this is the end of the string.

These steps are repeated until all cells have been examined. At this point, any cell that has not been marked as belonging to a non-circular string belongs to a circular string.

Once a circular string has been identified, the next step is to sever each circular string at its weakest connection. Beginning with the cell having the smallest index, 1. Examine each cell to determine whether it has been marked as belonging to a non-circular string. If it has, proceed to the cell with the next larger index.
2. If the cell does not belong to a non-circular string, it belongs to a circular string. Trace the string from one cell to the next by following its string connections, keeping track of the smallest transportability encountered and which two cells it connects. When the initial cell is reached, the circle has been completely traversed. Remove the string connection having the smallest transportability from the two cells it connects. Treat the cell of these two that has the smaller index as the beginning of the next string. Mark this cell as belonging to a non-circular string, add the string to the list of strings, initialize the string's list of cells, and then add the cell's index to this list of cells. Trace the string from one cell to the next by following its string connections, marking each cell as belonging to a non-circular string and adding each cell's index to the string's list of cells. When a cell is reached that does not have a string connection to another cell, this is the end of the string.
3. The above procedure is repeated until all cells have been examined. At this point, all cells belong to non-circular strings.

The next step is to sever any strings that "touch" themselves; i.e., that are connected to themselves via non-string connections. This is done a string at a time. Beginning at the first cell in a string having the smallest index number, 1. Determine whether any of the cell's connections, other than its string connections, connects it to another cell in the string. If not, proceed to the next cell in the string's list of cells.
2. If the cell has non-string connections to other cells in the string, determine the connected cell nearest to the beginning of the string. Initialize a position P1 to the current cell's position and a second position P2 to the connected cell's position in the string. The string will be severed somewhere between these two positions.
3. Move to the next cell in the string. Determine whether this new current cell has non-string connections to other cells in the string. If it does, set P1 to the current cell position. Determine the connected cell nearest the beginning of the string. If it is nearer the beginning than P2, set P2 equal to the connected cell's position.
4. If the position of the next cell in the string is P2, skip to step 5 below. Otherwise, repeat step 3.
5. Find the connection in the string between the cell at P1 and the cell at P2 having the smallest ranking of transportability value. Symbolically sever this connection by terminating the string at the connected cell nearer the beginning of the string. The other connected cell will be the first cell in a new string. Add this string to the list of strings, initialize the string's list of cells, and then add the connected cell's index to this list of cells. Trace the string from one cell to the next by following its string connections, adding each cell's index to the string's list of cells. When a cell is reached that does not have a string connection to another cell, this is the end of the string.

The new string will be at the end of the list of strings. As this procedure is performed string-by-string, eventually the new one will be reached. At this point, the string may get severed again. If it does, another new string will be created. Eventually all strings will get processed, at which point all strings will satisfy a predetermined set of string construction rules.

Once the strings are constructed, a matrix equation is developed for each string by assembling the linear equations associated with the cells of each string. The form of this matrix equation is the same as that for an LSOR line in a structured grid problem. The coefficient matrix equation contains the terms relating to flow between a cell and its in-string neighbors. The terms relating to flow between a cell and its out-of-string neighbors contribute to the right-hand side of the matrix equation.

Improved estimates of the state variables of the cells are then obtained by solving the matrix equation for each string, one string at a time, until all strings' matrix equations have been solved. This process is repeated iteratively until a convergence condition is satisfied. The iteration that is performed is essentially the same as LSOR, except that the lines are strings of cells rather than the rows or columns of a conventional LSOR. This method can therefore be referred to as string-successive overrelaxation.

The strings can be processed in any order, and they can be processed moving forward through a given order, then backwards through the same order. This yields a symmetric successive overrelaxation method. The discussion that follows assumes conventional, rather than symmetric, successive overrelaxation. One skilled in the art would be able to construct a symmetric successive overrelaxation form of the method.

Once a set of strings has been created, the solution change over the Newton iteration or timestep is obtained as follows. First, the set of equations for each string is assembled. The initial residuals are then computed, if they are not already known. These must include the effects of terms connecting the string's cells to cells in other strings. Then iterations are performed, each comprising the following steps.

1. Solve the string's matrix equation, using the string's current residuals as the right-hand side.
2. Multiply the solution change obtained in step 1 by an overrelaxation parameter, $\omega$, that lies between one and two. If Orthomin acceleration is used, the convergence rate usually depends only slightly on the value chosen, with the optimal value usually being between 1 and 1.5. If Orthomin is not used, the optimal value usually will be slightly smaller than 2, and the convergence rate will be more sensitive to the value chosen.
3. Update the string's residuals by multiplying them by the quantity $1 - \omega$.
4. Update residuals at all strings connected to the current string for the solution change at the current string. After this is done, all strings' residuals will be consistent with the current solution estimate. One skilled in the art would be familiar with such calculations.
5. Perform steps 1–4 for each string. The strings can be processed in any order, but the same order should be used for each iteration.
6. Optionally accelerate convergence using the additive correction, as described below.
7. Optionally accelerate convergence using Orthomin or another Krylov subspace method, as described below.
8. Check for convergence as evidenced by convergence measures being smaller than predetermined criteria. The above iteration steps 1–8 are repeated until a satisfactory convergence is obtained.

In a preferred embodiment, the convergence of the iterative method of this invention can be enhanced by using an additive correction similar to that used with conventional LSOR. A description of a preferred additive correction is described in a paper by J. W. Watts, entitled "An Iterative Matrix Solution Method Suitable for Anisotropic Problems", which appeared in the *Society of Petroleum Engineers Journal*, volume 11, March 1971, pages 47–51.

To apply the additive correction, it is first necessary to construct a correction matrix equation by summing the equations for each string. One skilled in the art of using the additive correction with LSOR will be able to construct this equation. The additive correction can then be applied using the following steps.

(6a) Sum the residuals over the cells in each string. If more than one species conservation equation is being used, sum the residuals for each of these equations over all cells in the string.
(6b) Solve the correction matrix equation using the summed residuals from step (6a) as the right-hand side. The solution will comprise one additive correction for each string for each unknown being solved for.
(6c) For each string, add the additive corrections determined in step 6(b) to the unknowns at each cell within the string.
(6d) Compute new residuals for all cells in all strings.

In another embodiment, the Orthomin method can also accelerate the convergence or some other method based on orthogonalization and minimization. The Orthomin method belongs to the class of Krylov subspace methods where the solution is projected onto a Krylov subspace. The Orthomin acceleration procedure is applied based on the overall solution change obtained. This is carried out by adding the change determined in iteration steps 1–5 above to the change determined in the additive correction steps (a) through (d) above. Orthomin is described in a paper by P. K. W. Vinsome entitled "Orthomin, an Iterative Method for Solving Sparse Banded Sets of Simultaneous Linear Equations", paper number SPE 5729, presented at the Fourth SPE Symposium on Numerical Simulation of Reservoir Performance, Los Angeles, Feb. 19–20, 1976. See also Saad, Y., 1989, "Krylov subspace methods on supercomputers", SIAM J. Sci. Stat. Comput., 10, p. 1200–1232.

The preferred embodiment uses Orthomin, but other acceleration methods can be used, such as the GMRES, which is described in a published report by Saad, Y. and Schultz, M. H., "A Generalized Minimum Residual Algorithm for Solving Nonsymmetrical Linear Systems", Technical Report 254, Yale University, 1993.

The Orthomin calculation comprises the following steps:
(7a) Compute the parameters used by Orthomin.
(7b) Using these parameters, update the solution estimate.
(7c) Compute new residuals for all cells in all strings.

The correction matrix equation, used in step 6, has the same form as the original matrix equation. As a result, it can be solved using the above iteration. Doing so involves constructing strings of strings.

The iterative solution produces state variables for all cells that simultaneously satisfy the linear equations for all the cells within the accuracy corresponding to the pre-specified convergence criteria used. The improved solution can then be used to simulate at least one characteristic of the physical system. If the physical system is a reservoir, the characteristic being simulated could include for example oil pressure, water pressure, oil saturation, and water saturation. Other characteristics can be derived from these variables, such as oil production rate and water production rate.

The iterative calculations can be repeated for a plurality of timesteps and the results can be used to predict a property of the physical system and the transport phenomena occurring in it as a function of time.

The method of the present invention will now be described with reference to drawings. As background information to aid the reader in understanding the present invention, a brief discussion of the principles of line-successive overrelaxation (LSOR) is presented with respect to FIGS. 1 and 2. FIG. 3 illustrates a simplified example of an unstructured grid system, which prior to the method of this invention would not have used LSOR in simulation operations. FIGS. 4–9 provide examples of maps of grid systems which will be referred to in describing a preferred procedure for constructing strings or lines of cells suitable for applying the principles of LSOR in simulation.

FIG. 1 illustrates a simplified two-dimensional Cartesian model of a physical system that has been divided into 50 cells organized into 5 rows (a, b, c, d, and e) and 10 columns (1 through 10). For a simulation based on the cells of FIG. 1, LSOR can be applied to lines of cells that form either the rows or the columns. If the LSOR lines are the columns, and if it is assumed that the simulation computations proceed from left to right, the first step would be to compute an improved solution in the first column, holding fixed the solution in the second column at its current estimate. The second step of the LSOR method computes an improved solution in the second column, holding fixed the solution in the first column at its current estimate, which was computed in the first step, and also holding fixed the solution in the third column at its current estimate. The next steps would compute an improved solution in the third column, in the fourth column, and so on, until improved solutions are computed in all columns. This process would constitute one LSOR iteration. It is repeated until a solution of the desired accuracy is obtained.

In LSOR, the orientation of the lines is important. Whether LSOR converges fastest when performed by columns or by rows depends largely on the strength of coupling between cells within rows and within columns. The coupling between two cells is strong if changes in the state of one of the cells strongly affect the state of the second, and it is weak if such changes in the first cell have little impact on the second. In simulating a reservoir, two cells having large transmissibility across the boundary between the cells are considered to be strongly coupled. LSOR usually converges fastest if it is performed by lines lying in the direction of strongest coupling. The fact that the cells in FIG. 1 have more width than height indicates that the coupling is stronger within columns than within rows, since strength of coupling between two cells is typically directly proportional to the cross-sectional area available for transport between them and inversely proportional to the distance between their centers. When the coupling is stronger within columns than within rows, which is the case for the cells depicted in FIG. 1, LSOR generally converges faster if its lines are columns than if they are rows. In reservoir simulations, the iterative convergence rate will be faster if the line orientation is in the direction of high transmissibility, which will often be cells oriented along columns of cells for regular, structured grid systems.

It is known that LSOR convergence can be accelerated by applying an additive correction. The additive correction is most effective when coupling is much stronger in one direction than in the other direction or directions and when a single unknown, such as each cell's temperature in a heat conduction problem, is being determined. If LSOR is being performed by columns, the additive correction is a quantity that is added to each temperature in a column of cells. Each equation required to compute the additive correction is obtained by summing the equations within a column of cells, which in effect determines the equation that would apply if the column of cells were treated as a single cell.

The direction of strongest coupling can sometimes vary in space. This variance in direction can be illustrated by gridcells shown in FIG. 2, which depicts a two-dimensional model of a physical system that has been divided into 75 cells organized into 5 rows (a, b, c, d, and e) and 15 columns (1 through 15). As in FIG. 1, the geometry of the cells in FIG. 2 indicates the strength of coupling. The larger the boundary between cells, the greater the coupling between the cells. On the left end (column 1), coupling is strongest within rows, while near the right end (column 15), coupling is strongest within columns. Either possible choice of LSOR orientation represents a compromise. LSOR may converge slowly in such a model.

FIG. 3 illustrates a simplified example of an unstructured grid of cells. It is called unstructured because its cells do not all have the same shape and their connectivity does not follow a fixed pattern for all the cells. This grid does not contain lines of cells, neither columns nor rows, over which it is natural to apply LSOR. If LSOR is to be used in solving the equations for such unstructured cells, the LSOR procedure must first be modified. The inventor has discovered a novel method for developing lines (or strings) that can be used as a solution method based on the principles of LSOR.

Figures 4, 5:
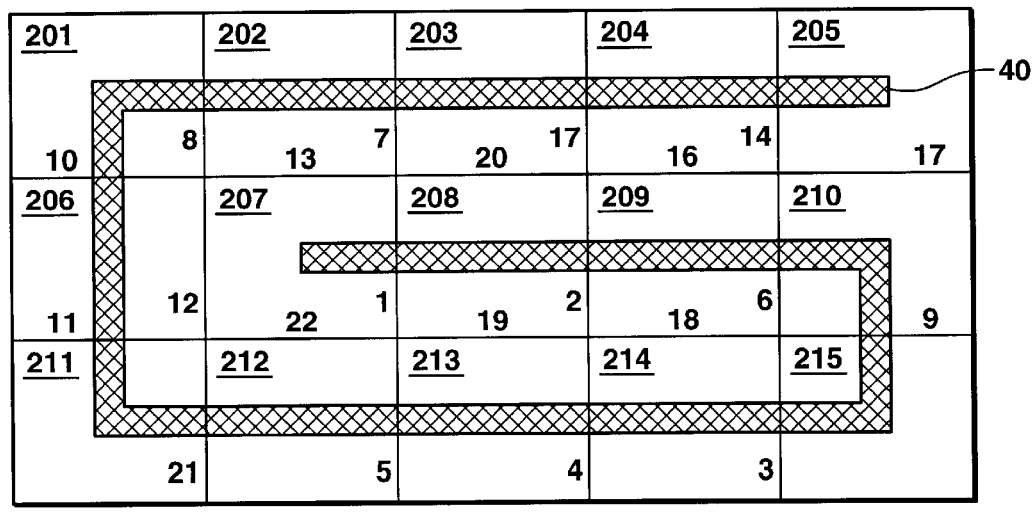
FIG. 4 depicts a simple two-dimensional 3-cell by 5-cell grid of 15 cells, showing transportability rankings between cells.
FIG. 5 depicts the grid of FIG. 4, showing the initial step in decomposing the 15-cell grid into a string of cells.
Figures 6, 7:
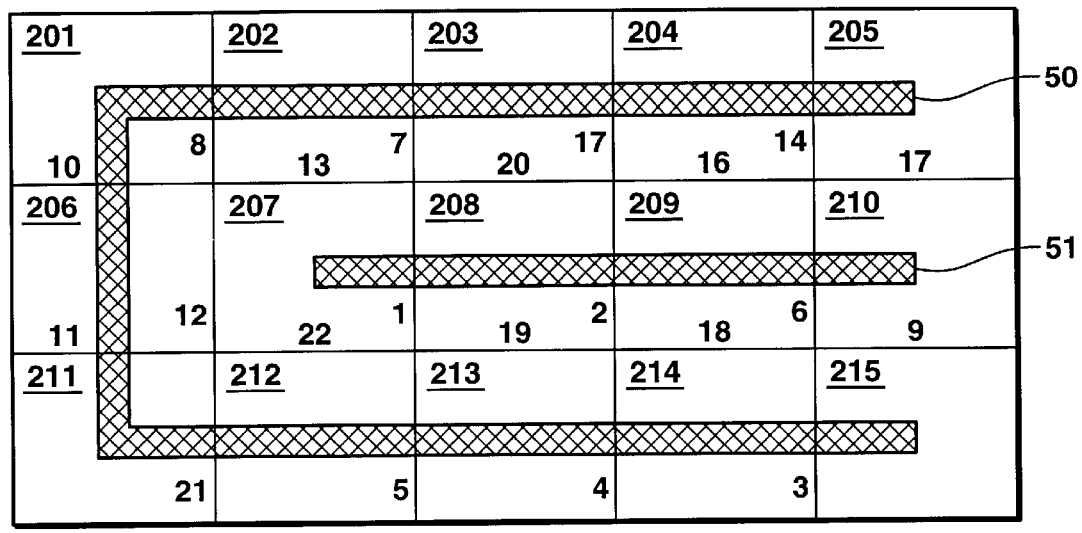
FIG. 6 depicts the grid of FIG. 4, after the string shown in FIG. 5 has been cut to form two strings.
FIG. 7 depicts a simple two-dimensional 3-cell by 6-cell grid of 18 cells, showing transportability rankings between cells.

A preferred procedure for constructing strings will now be described with reference to FIGS. 4, 5 and 6, which illustrate a topological one-dimensional map of 15 cells numbered 201 through 215. Each pair of adjacent cells has a boundary therebetween, with a total of 22 boundaries for the 15 cells. The strings are constructed in accordance with a rule that promotes including in strings as many possible of the cells having large transportability values. Transportability values are first determined by any suitable means and transportability values are ranked with the largest transportability value having a ranking of one to the smallest transportability value having the lowest ranking. The boundaries (or connections) are thus ranked from the strongest cell coupling to the weakest. In FIGS. 4–6, because there are 22 boundaries, the transportability rankings range from 1 through 22. In FIGS. 4–7, the numbers assigned to each boundary represent the transportability ranking at each boundary. For example, the boundary between blocks 207 and 208 has the largest transportability value and is therefore assigned a ranking of 1. The boundary between cells 208 and 209 has the second largest transportability value and is assigned a ranking of 2. This process is repeated for all 22 boundaries.

The preferred rule for constructing strings of cells is to form topologically one-dimensional bodies of adjacent cells containing as many as possible of the highest ranked transportability values. This rule is carried out by joining the two cells on either side of the highest ranked connection, then joining the two cells on either side of the next highest ranked connection, and recursively proceeding in that fashion, always joining the two cells on either side of the highest-ranked remaining connections, unless one or both of the cells on either side of the connection has already been joined to two other cells, until the list of connections has been exhausted. If any cell on either side of a boundary was previously joined to two cells, that boundary does not form a connection for purpose of building a string.

Applying this string construction rule to the grid of FIG. 4, since the connection between cells 207 and 208 has the highest transportability value ranking, these two cells are joined first. Next, cells 208 and 209 are joined since the connection between them has ranking number 2. Rank 3 lies between cells 214 and 215, so these two cells are joined next. This process is continued recursively with all cell connections being considered as possible string connections. Although not shown in FIG. 4, this construction procedure may result in several cells not having a connection to a neighboring cell, in which case such stand-alone cells would form one-cell strings. Using this procedure for the cells of FIG. 4, the result is a single string as depicted in FIG. 5.

FIG. 5 shows a string 40 made up of cells lying on a topologically one-dimensional line. An analysis of string 40 shows that the string touches itself. As used in this description of the invention, a string touches itself if a given cell of a string has a boundary with a second cell in the string and the second cell is not a cell immediately before or after the given cell. Therefore, in accordance with the preferred rule for string construction, string 40 needs to be cut. Using the cutting procedure described above, the cutting process begins by analyzing the cells of string 40 starting at one end. Starting with cell 207, it touches cells 212, 206, and 202; of these, cell 212 is nearest the beginning of the string. Position P1 points to cell 207 and position P2 to cell 212. Next, cell 208 is considered. It touches cells 203 and 213. P1 now points to cell 208, and P2 points to cell 213, since 213 is closer to the beginning of the string than 212. Next, cell 209 is processed. It touches cells 204 and 214; P1 now points to 209 and P2 to 214. Finally, cell 210 touches cell 205. P1 now points to cell 210. P2 is unchanged, since cell 205 is not nearer the beginning of the string than cell 214. Cell 215 does not touch another cell. The cut is made between cells 210 and 214 at the connection having the lowest transportability value. The connections between cells 210 and 214 have transportability rankings of 3 and 9. Since the lowest ranking is 9, the cut is made at the connection between cell 210 and cell 215.

FIG. 6 shows the final result after cutting string 40 of FIG. 5 to form two strings 50 and 51. Referring to FIG. 6, string 50 consisting of the topologically one-dimensional line of cells 205, 204, 203, 202, 201, 206, 211, 212, 213, 214, and 215 and string 51 consisting of the topologically one-dimensional line of cells 207, 208, 209, and 210. Within strings 50 and 51, the highest ranked connection that is not in a string is ranked ninth (between cells 210 and 215). Nine of the eleven highest-ranked connections lie within strings 50 and 51. These two strings meet the objective of including in strings as many as possible of the connections having the highest ranked transportability values.

Application of the foregoing construction methodology is summarized in Table 1 below with respect to the 15 cells depicted in FIGS. 4–6. The fourth column of Table 1 indicates whether a string connection becomes part of a string (before any string cuttings are carried out). For example, connection ranking number 1 corresponds to the boundary between cells 207 and 208 and, since this is the first string connection, neither cell on either side of this boundary was previously joined to more than one cell. This process is applied to the connection rankings 1 through 22. Some of the connections do not become connections within a string. For example, referring to Table 1, the connection ranked number 12 (the boundary between cells 206 and 207) cannot be placed within a string because cell 206 was previously joined to cells 211 and 201. Cell 206 is therefore considered full. Stated another way, cells 206 and 207 cannot be adjacent cells in a string of cells. Similarly, connection ranking 20 between cells 203 and 208 cannot be a connection in a strings of cells because cells 203 and 208 are full; cell 203 was previously joined to cells 202 and 204 and cell 208 was previously joined to cells 207 and 209.

Figure 8:
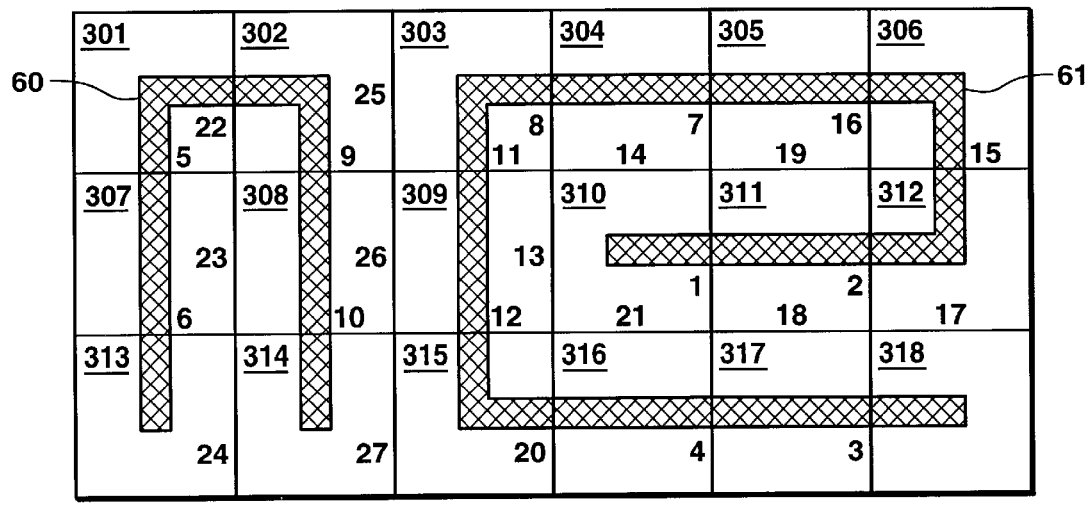
FIG. 8 depicts the grid of FIG. 7 showing the initial step in decomposing the 18-cell grid into two strings of cells.
Figure 9:
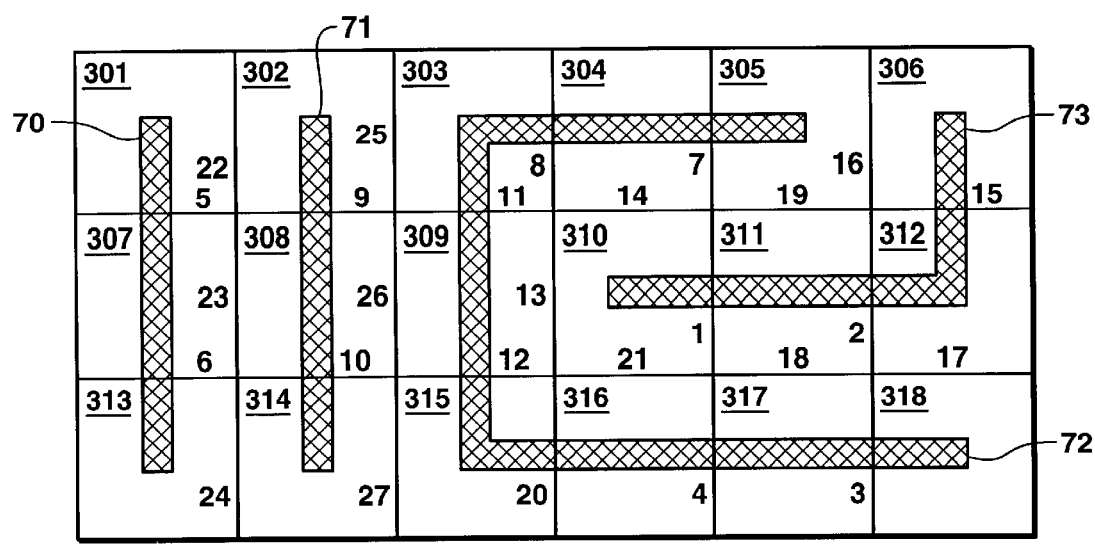
FIG. 9 depicts the grid of FIG. 7, after the two strings shown in FIG. 8 have been cut to form four strings.

FIGS. 7, 8, and 9 illustrate a map of 18 cells numbered 301 through 318. Each pair of adjacent cells has a boundary therebetween, with a total of 27 boundaries for the 18 cells. In a manner similar to the ranking process described above with respect to FIGS. 4–6, rankings of transportability values numbering 1 through 27 were assigned to the boundaries. FIGS. 7, 8, and 9 show the transportability value rankings associated with each boundary. The same string construction rules used to construct string 40 of FIG. 5 are used to construct strings from the 18-cell grid depicted in FIG. 7. The results of the string construction are shown in FIG. 8. Two strings 60 and 61 are formed. String 60 consists of the topological line of cells 313, 307, 301, 302, 308, and 314 and string 61 consists of the topological line of cells 310, 311, 312, 306, 305, 304, 303, 309, 315, 316, 317, and 318.

The cell by cell analysis of the cell rankings for the purpose of constructing strings 60 and 61 is summarized in Table 2 below using the same string construction rules as used in developing the data of Table 1.

Once the strings 60 and 61 are constructed, the next step is to consider whether the strings need to be cut. String 61 is processed first because its first cell is number 310, whereas string 60 starts with cell 313. Referring again to FIG. 8, string 61 is analyzed to determine whether it needs to be cut. The analysis starts with cell 310. Positions P1 and P2 successively point to cells 310 and 304, 311 and 305, and 312 and 305. String 61 is cut at the weakest coupling between cells 305 and 312. The potential couplings for this cut have transportability rankings of 16 and 15, with 16 being the weakest coupling. To promote inclusion of the highest ranked transportability values, the cut is made at the connection between cells 305 and 306, the lowest ranked connection, to form two strings 72 and 73 which are illustrated in FIG. 9. By performing a similar analysis on cells in string 72, it is determined that no further cutting is necessary since string 72 does not touch itself.

Next, string 60 is analyzed to determine if it too must be cut. The analysis begins at cell 313. Positions P1 and P2 point to cells 313 and 314, and then to 307 and 308. String 60 is cut by finding the weakest connection between cells 307 and 308. Between cells 307 and 308, the connections eligible for cutting have transportability rankings 5, 22, and 9. Since 22 is the lowest ranking of these three, string 60 is cut between cell 301 and 302 to form, as shown in FIG. 9, two strings 70 and 71.

The invention is not to be unduly limited to the foregoing which has been set forth for illustrative purposes. On the contrary, a wide variety of modifications and alternative embodiments will be apparent to persons skilled in the art without departing from the true scope to the invention, as defined in the claims set forth below.

TABLE 1

| Connection Rank | Behind Connected Cell | Ahead Connected Cell | String Connection? |
| --- | --- | --- | --- |
| 1 | 207 | 208 | yes |
| 2 | 208 | 209 | yes |
| 3 | 214 | 215 | yes |
| 4 | 213 | 214 | yes |
| 5 | 212 | 213 | yes |
| 6 | 209 | 210 | yes |
| 7 | 202 | 203 | yes |
| 8 | 201 | 202 | yes |

TABLE 1-continued

| Connection Rank | Behind Connected Cell | Ahead Connected Cell | String Connection? |
|---|---|---|---|
| 9 | 210 | 215 | yes |
| 10 | 201 | 206 | yes |
| 11 | 206 | 211 | yes |
| 12 | 206 | 207 | no; 206 is full |
| 13 | 202 | 207 | no; 202 is full |
| 14 | 204 | 205 | yes |
| 15 | 205 | 210 | no; 210 is full |
| 16 | 204 | 209 | no; 209 is full |
| 17 | 203 | 204 | yes |
| 18 | 209 | 214 | no; 209 & 214 are full |
| 19 | 208 | 213 | no; 208 & 213 are full |
| 20 | 203 | 208 | no; 203 & 208 are full |
| 21 | 211 | 212 | yes |
| 22 | 207 | 212 | no, 212 is full |

TABLE 2

| Connection Rank | Behind Connected Cell | Ahead Connected Cell | String Connection? |
|---|---|---|---|
| 1 | 310 | 311 | yes |
| 2 | 311 | 312 | yes |
| 3 | 317 | 318 | yes |
| 4 | 316 | 317 | yes |
| 5 | 301 | 307 | yes |
| 6 | 307 | 313 | yes |
| 7 | 304 | 305 | yes |
| 8 | 303 | 304 | yes |
| 9 | 302 | 308 | yes |
| 10 | 308 | 314 | yes |
| 11 | 303 | 309 | yes |
| 12 | 309 | 315 | yes |
| 13 | 309 | 310 | no; 309 is full |
| 14 | 304 | 310 | no; 304 is full |
| 15 | 306 | 312 | yes |
| 16 | 305 | 306 | yes |
| 17 | 312 | 318 | no; 312 is full |
| 18 | 311 | 317 | no; 311 & 317 are full |
| 19 | 305 | 311 | no; 305 & 311 are full |
| 20 | 315 | 316 | yes |
| 21 | 310 | 316 | no; 316 is full |
| 22 | 301 | 302 | yes |
| 23 | 307 | 308 | no; 307 & 308 are full |
| 24 | 313 | 314 | yes |
| 25 | 302 | 303 | no; 302 & 303 are full |
| 26 | 308 | 309 | no; 308 & 309 are full |
| 27 | 314 | 315 | no; 314 & 315 are full |

What is claimed is:

1. A method of simulating at least one characteristic of physical system, comprising the steps of:
   (a) discretizing the physical system into a plurality of volumetric cells arranged adjacent to one another so as to have a boundary between each pair of adjacent cells;
   (b) assigning an initial estimate of state variables for each cell;
   (c) constructing for each cell linear equations relating its state variables to the state variables of cells adjacent to it;
   (d) associating with each boundary a transportability value and ranking the boundaries corresponding to descending transportability values;
   (e) using the boundary rankings to construct topologically one-dimensional strings of cells;
   (f) developing a matrix equation for each string by assembling the linear equations associated with the cells of each string;
   (g) obtaining improved estimates of the state variables of the cells by solving the matrix equation for each string, one string at a tie, until all strings' matrix equations have been solved;
   (h) repeating step (g) until a convergence condition is satisfied, thereby obtaining state variables for all cells that simultaneously satisfy the linear equations for all cells; and
   (i) using the state variables determined in step (h) to simulate at least one characteristic of the physical system.

2. The method of claim 1 wherein the construction of strings uses a rule that promotes construction of strings having high transportability values at cell boundaries between cells in the same string.

3. The method of claim 1 further comprising the steps of;
   (i) hierarchically ranking the boundaries corresponding to relative sizes of the transportability values, the boundaries being ranked in descending order from the boundary having the highest transportability value to the boundary having the lowest transportability value; and
   (ii) constructing the stings in step (e) according to a first rule that promotes inclusion of cells having as many as possible of the highest ranked transportability values associated with the boundaries between the cells and a second rule requiring tat any given cell in a string shall have boundaries with no more than two other cells in the same topological string of cells.

4. The method of claim 1 wherein for any given string used in step (f), no given cell in the given string is connected to a cell in the sting other than a cell immediately before or immediately after the given cell in the given string.

5. The method of claim 1 wherein the string constructed in step (e) is circular, the method further comprising the step of cutting the string at the lowest ranking boundary in the circular string of cells.

6. The method of claim 1 wherein a given string constructed in step (e) contains a cell that touches another cell in the given string that is neither immediately before nor immediately after the cell, the method further comprising the steps of staring at one end of the given string and determining cell by cell whether a given cell in the given sting touches another cell in the given string that is neither immediately behind nor immediately ahead of the given cell, identifying the last cell in the string that touches another cell in the string, identifying the lowest ranking boundary between said last cell and the closest cell before the last cell that touches another cell in the string, and cutting the string at the lowest ranking boundary between said the last cell and the closest cell before the last cell that touched another cell n the string, thereby forming two new strings from the given string.

7. The method of claim 1 wherein the matrix equation assembled for each string in step (g) is constructed for line-successive overrelaxation.

8. The method of claim 7 further comprising the step of applying an additive correction to the improved estimated solution of step (f) within each string, with the additive correction being determined such that its application causes the sum of residuals within each string to become zero.

9. The method of claim 1 wherein iterative solution is accelerated by a Krylov acceleration method.

10. The method of claim 9 wherein the acceleration method uses the Orthomin method.

11. The method of claim 9 wherein the acceleration method uses the GMRES method.

12. The method of claim 1, wherein the construction of strings in step (e) forms circular strings, an additional step of breaking each circular string at the boundary having the lowest ranked transportability value.

13. The method of claim 1 wherein the physical system comprises a hydrocarbon-bearing reservoir, wells that extend from the surface of the earth to the reservoir, hydrocarbon-bearing flowlines at the surface of the earth, and hydrocarbon processing facilities.

14. The method of claim 1 wherein the physical system comprises a subterranean aquifer.

15. The method of claim 1 wherein the characteristic being simulated is heat transfer in the physical system.

16. The method of claim 1 wherein (he physical system being simulated is a hydrocarbon-bearing reservoir.

17. The method of claim 1 wherein the matrix equation being solved results from the use of finite difference approximations.

18. The method of claim 1 wherein the matrix equation being solved results from the use of finite element approximations.

19. The method of claim 1 wherein the matrix equation being solved results from the use of finite volume approximations.

20. The method of claim 1 wherein the volumetric cells comprise a plurality of unconstructed cells.

21. The method of claim 1 wherein the volumetric cells comprise both structured and unstructured cells.

22. The method of claim 1 further comprising the steps of
  (i) identifying a string having a cell that has a boundary with more than two cells of the string; and
  (ii) cuing the string to thereby form two strings.

23. The method of claim 1 wherein the cutting of the string is at the boundary having the lowest transportability value lying between the two cells that are touching each other and the cells and boundaries between such two cells in the one-dimensional string of cells.

24. The method of claim 1 wherein the linear equations of step (c) relate the state variables of a cell at the end of a time interval to the state variables of cells adjacent to it also at the end of time interval.

25. A method for predicting a characteristic of a physical system containing multiple fluids, comprising the steps of:
  (a) discretizing the physical system into a plurality of volumetric cells arranged adjacent to one another so as to have a boundary between each pair of adjacent cells;
  (b) assigning an initial estimate of state variables for each cell;
  (c) for each cell, constructing governing equations representative of the behavior of the fluids in the cell over a time interval, said equations using fluid and transport properties computed at the end of the time interval;
  (d) constructing linear equations by linearizing the governing equations;
  (e) associating with each boundary a transportability value and ranking the boundaries corresponding to descending transportability values;
  (f) using the boundary rankings to construct topologically one-dimensional strings of cells;
  (g) developing a matrix equation for each string by assembling the linear equations associated with the cells of each string;
  (h) obtaining improved estimates of the state variables of the cells by solving the matrix equation for each string, one string at a time, until all strings' matrix equations have been solved,
  (i) repeating step (h) until a convergence condition is satisfied, thereby obtaining state variables for all cells that simultaneously satisfy the linear equations for all cells;
  (j) using the results of step (i) to predict a characteristic of the physical system and the fluids it contains at the end of the time interval; and
  (k) performing steps (b) through (j) for a plurality of time intervals and using the results to predict a property of the physical system and the fluids it contains as a function of time.

26. The method of claim 25 wherein the physical system is a subterranean.

27. The method of claim 25 wherein the subterranean formation contains hydrocarbon fluids.

28. The method of claim 25 wherein the physical system comprises fluid-containing facilities associated with production of hydrocarbons formation subterranean hydrocarbon-bearing formation.

29. The process of claim 25 wherein the fluid-containing facilities are surface flow lines and wellbore tubing.

30. The method of claim 25 wherein the results of step (i) are used to predict the pressure and saturation of a fluid in the physical system.

31. The method of claim 25 where the cells are finite difference gridcells and the governing equations are finite difference equations.

32. The method of claim 25 wherein the cells are unstructured.

33. The method of claim 25 wherein the cells are structured.

34. The method of claim 25 wherein the cells are finite elements and the governing equations are finite element equations.

35. The method of clam 25 wherein the cells are finite volumes and the governing equations are finite volume equations.

* * * * *